Patented Aug. 31, 1937

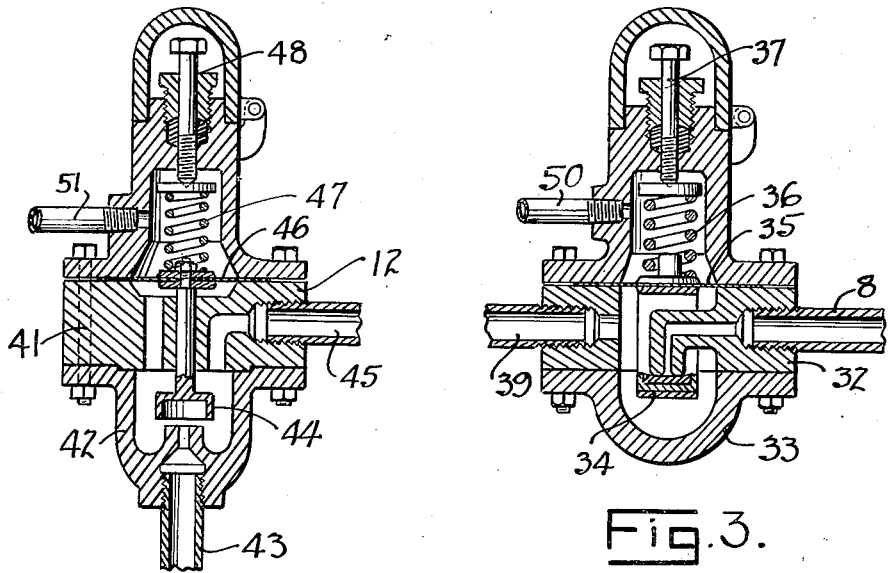
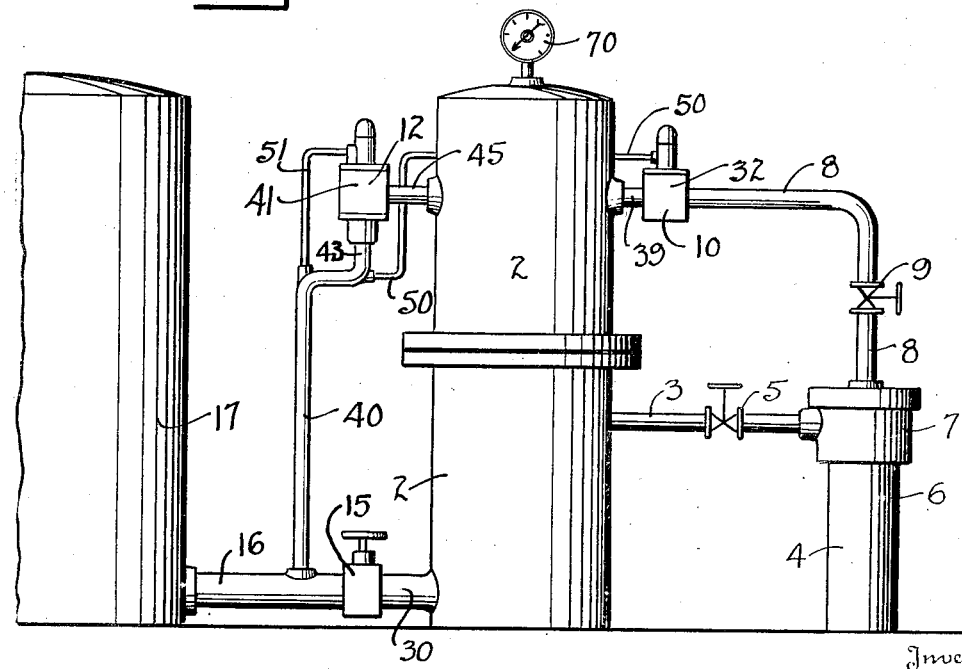

2,091,482

UNITED STATES PATENT OFFICE 2,091,482

PRESSURE FLOW REGULATOR

James R. McCreary and Louis H. Fuller, Houston, Tex.

Application June 4, 1934, Serial No. 729,008

2 Claims. (Cl. 50—10)

The invention relates to a pressure flow control system which embodies an arrangement of valves for balancing the pressures on a flow valve, so that a constant differential pressure may be maintained on the upstream and downstream sides of such valve, regardless of the fluctuation of the initial and back pressures which are being controlled.

The invention may be applied to various fields of endeavor, but is particularly related to a control system for restricting the flow of oil from wells.

With the advent of proration or restriction of the flow of oil from wells it has been necessary to accurately gauge the flow from each well in order to prorate the flow from each well with respect to other wells. Various devices have been devised with a view of controlling and measuring the flow from the well. Such control is difficult, however, because of the varying circumstances under which the flow must be measured. It is not uncommon for the well pressure to vary from a few pounds up to as high as several thousand pounds per square inch, so that the pressure on the upstream side of the flow valve is not always constant. On the other hand the flow of oil through the flow valve is usually led to a separator or pipe line, and the pressure in such separator or pipe line is not always constant so that the valve is subjected to a variation in the back pressure thereon. With these circumstances in mind it will be readily apparent that a constant pressure differential on the flow valve can only be maintained by means of a pressure flow system which will balance itself in accordance with the variation in upstream and downstream pressure. With this in mind, the present arrangement and combination of devices has been worked out.

It is one of the objects of the invention to provide a system of valves and controls whereby a constant differential may be maintained upon a flow valve when the upstream and downstream pressures thereon are subject to variation.

Another object of the invention is to provide a method and apparatus for maintaining a constant pressure on the upstream side of a flow valve, which pressure will be augmented by any variation in pressure on the downstream side of the valve.

Other and further objects of the invention will be readily apparent when the following description is considered in connection with the accompanying drawings wherein:

Fig. 2 is a section through the valve for controlling the variation in the back pressure which is used to augment the constant pressure applied to the upstream side of the flow valve.

Fig. 3 is a section of the reducer valve which is used to maintain the constant pressure on the upstream side of the flow valve.

Fig. 4 is a side elevation of one arrangement of the system as applied to an oil well and illustrating the control system in combination with the well and the separator.

Figure 1:
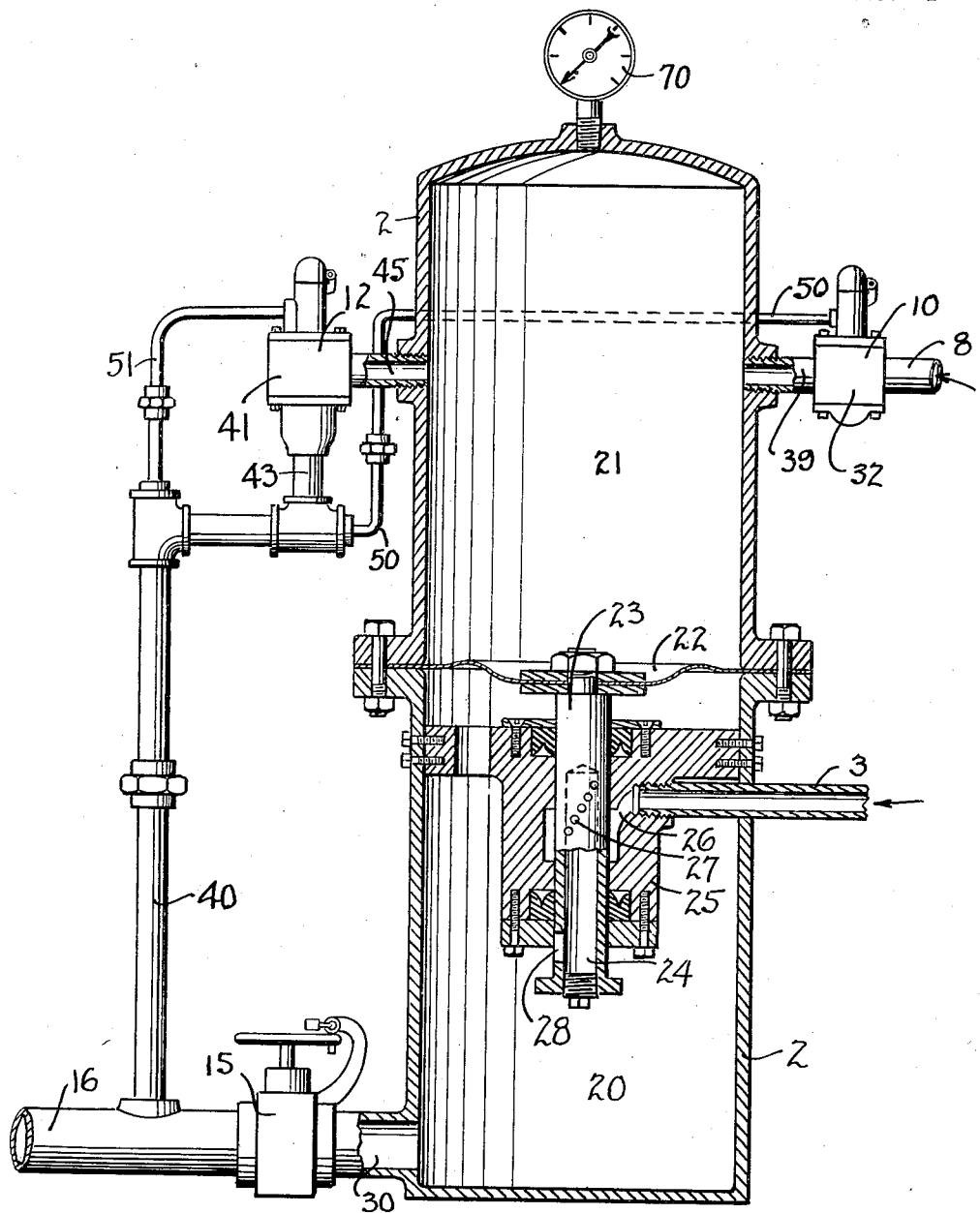
Fig. 1 is a side elevation on an enlarged scale of the control members and illustrating the arrangement of the valves and pressure lines.

The arrangement of the system shown in Fig. 4 includes the control housing 2 which is arranged to receive the flow of oil through the tubing 3 which leads from the well head 4. A valve 5 is provided in this flow line to close the flow line completely if desired. The tubing, as is the usual practice, extends down into the well inside the casing 6 and projects from the casing head 7. An outlet 8 controlled by the valve 9 extends from the casing head 7 and leads to the reducer valve 10. A back pressure control valve 12 is also connected to the housing 2, as is the flow valve 15. The flow valve is connected into the pipe 16 and leads to the separator 17. This gives a general outline of arrangement of the parts, it being intended that the pressure in the tubing 3 will be controlled as it passes into the housing 2, with a view of providing a constant pressure on the upstream side of the flow valve 15. The back pressure on the valve 15 from the separator 17 will vary and this variation is applied to the valves 10 and 12 in order to control the admission of liquid from the tubing 3 to the upstream side of the valve 15.

In the present illustration the casing head pressure is used to apply to the valve 10 because this pressure is usually greater than the pressure in the tubing 3 and is a clean gas which can be fed into the separator as desired when there is a reduction in the back pressure as will be later described. It is to be distinctly understood, however, that the balancing pressure applied to the valve 10 may be obtained from any suitable source of pressure, and that the casing head pressure is merely used as a matter of convenience.

The housing 2 is divided into the high pressure chamber 20 and the low pressure chamber 21 by means of a diaphragm 22. This diaphragm is arranged for movement in accordance with the balancing or unbalancing of the pressures in the chambers 20 and 21. Connected to this diaphragm 22 is the control valve 23 which is in the form of a sleeve valve which is hollow at 24 to permit the passage of fluid. This valve is arranged for sliding movement through the spider 25 which is hollowed out at 26 to permit engagement of the fluid entirely around the valve member. Fluid will enter the valve through a series of openings 27 and pass through the hollow portion 24 to the lower end of the valve where it will escape through the orifice 28. It seems obvious from this that the volume of liquid which will flow through the valve is dependent upon its vertical position in the spider 25, and that the position of the valve is in turn controlled by the balancing or unbalancing of the pressures in the chambers 20 and 21.

The flow line 3 is shown as extending through the housing and into the spider 25 so that flow of fluid from the well will be attempting to enter the valve at all times. It is not uncommon for the pressure in the flow line 3 to vary from a few to several thousand pounds per square inch. It is, of course, desirable to control the volume entering the chamber 20 so that a substantially constant pressure will be applied to the upstream side 30 of the flow valve 15.

With the arrangement of the parts thus described, any pressure in the line 3 will flow through the valve 23 into the chamber 20 and will be exerted on the diaphragm 22 and against the upstream side of the valve 15. This pressure would, of course, instantly raise the diaphragm 22, the valve 23, and cut off any further flow of fluid through the valve until the pressure had exhausted from the chamber 20 through the valve 15. In order, however, that the movement of the control valve 23 will be determined a pressure is applied in the low pressure chamber 21 through the reducer valve 32. This reducer valve is connected in the line 8 which leads to a suitable source of fluid pressure, in the present instance the casing head 7. As previously explained, the pressure in this line 8 will exceed the pressure in the line 3. In order, however, that the valves and parts may work at lesser pressures than ordinarily encountered in the well, the reducer valve 32 may be set to open at any desired pressure. Such a valve is illustrated in section in Fig. 3 and includes a housing 3 to which the line 8 is connected so that the pressure of this line 8 is applied against the closure member 34 which is held over the opening in the valve from the pipe 8.

This closure member 34 is normally held in closed position by means of a diaphragm 35 which is of such a strength that it will normally resist opening of the valve by any pressure which would be encountered in the pipe 8.

To adjust the valve so that it will open at a desired pressure, a spring 36 is arranged to abut against the upper side of the diaphragm 35 and is adjustable by means of a setscrew 37. It will be obvious that a considerable area of the closure member and the diaphragm 35 is exposed to the pressure inside of the housing 33 which is the same as the pressure in the chamber 21 because of the pipe connection 39 leading from the inside of the housing.

With this arrangement, adjustment of the setscrew 37 will determine the pressure in the chamber 21 at which the valve will open to admit further pressure from the line 8. With this arrangement the reducer valve 32 may be set for instance to admit and maintain a pressure of 100 pounds in the chamber 21 so that the control valve 23 will remain closed so long as the pressure in the chamber 20 is greater than 100 pounds. When the pressure escapes from the chamber 20 through the flow valve, so that the pressure in the chamber 20 drops below 100 pounds, then the diaphragm 22 and control valve 23 will move downwardly to admit additional fluid from the well, and immediately close again when the pressures are balanced in the two chambers; that is, when the pressures are substantially balanced when the friction necessary to move the valve 23 is considered.

From the foregoing it will be apparent that in this manner a constant pressure will be maintained on the upstream side of the flow valve 15 regardless of any fluctuation of the pressure in the tubing line 3, and will be determined by the adjustment of the reducer valve 32.

The device would operate satisfactorily under these conditions if the back pressure from the separator 17 in the line 16 remained at a constant value; that is, if the back pressure were constant the upstream pressure would remain constant and by setting of the flow valve 15 a predetermined volume of liquid would pass through the flow valve in any determined period so that the flow from the well would be regulated.

The valve 15 could be sealed by the proper authorities and any tampering with the arrangement could be readily determined. The problem, however, is not as simple as it sounds because of variation in the back pressure in the separator and the pipe 16. This variation in back pressure on the downstream side of the flow valve 15 changes the differential pressure applied to the valve and accordingly changes the volume of flow through the valve.

The present invention contemplates the augmenting of the constant pressure which has been set by the amount of the back pressure which is present on the flow valve 15. When this is accomplished any variation in the back pressure results in an identical variation in the applied or constant pressure, so that such constant pressure is augmented in accordance with the valve and a constant differential pressure maintained on the flow valve.

To provide for the foregoing a bypass line 40 is connected to the outlet 16 on the downstream side of the flow valve 15. This bypass leads to the downstream side of the back pressure regulating valve 41. The internal construction of this valve is seen in Fig. 2, and it includes a housing 42 to which the bypass branch pipe 43 is connected. Any pressure in the line 43 tends to raise the valve member 44 and allow a flow of fluid from the chamber 21 through the inlet pipe 45. The raising of the valve 44, however, is resisted by a diaphragm 46 which operates the same as the diaphragm 35 in the valve 32. The spring 47 is used to regulate the movement of the diaphragm and the adjustment of this spring is had by means of the setscrew 48.

Any pressure in the chamber 21 will be exerted inside of the housing of the valve so that if the pressure in the chamber 21 increases above a predetermined value for which the valve is set, it will move the diaphragm 46, raise the valve member 44, and bleed off from the chamber any excessive pressure beyond the setting of this valve. This pressure flow will escape through the line 43 and inasmuch as, in the present illustration, this is a clean gas from the casing head it can flow directly to the separator 17.

In order that the constant pressure in the chamber 21 may be augmented by the value of the back pressure in the separator 17, an extension of the bypass line 40 is shown at 50 and 51. The line 50 leads to the reducer valve 32 and enters the top of the housing around the spring 36, so that this pressure is exerted on the diaphragm 35, and is added to the pressure of the spring 36 to augment the constant pressure at which the valve would normally open were not this pressure exerted. Therefore, if the valve is set to open at 100 pounds and the back pressure fluctuated from 20 to 40 pounds, then the valve would open in accordance with the set pressure when augmented by the back pressure.

The line 51 in a similar manner leads to the top of the valve 41 and is admitted to the chamber around the spring 47 to augment the pressure at which the valve would open, due to any change in back pressure.

The arrangement of the valves 32 and 41, therefore, determines the pressure which will be present in the chamber 21 to actuate the control valve and this pressure varies directly in accordance with any variation in the back pressure. Thus, if there is no back pressure on the flow valve 15 in the line 10 with the valves 32 and 41 set to open at 100 pounds, there would be a 100-pound differential pressure on the valve 15. Immediately, however, when a back pressure builds up behind the valve 15 this back pressure would be added to the constant pressure to raise it to say 140 pounds if the back pressure was 40 pounds. This would, of course, create a pressure of 140 pounds in the chamber 21, open the control valve 23, and admit a pressure of 140 pounds to the chamber 20 so that the pressure on the upstream side of the flow valve would be 140 pounds and the pressure on the downstream side 40 pounds, so that the 100 differential pressure would be maintained. Any fluctuation in either the initial pressure or the back pressure would be taken care of by the fluctuating of the valves so that when the flow valve 15 was set and sealed for a predetermined flow, the authorities and the well owner as well would be assured that only this flow would occur. A pressure gauge 70 is shown on the top of the housing to indicate the pressure at which the device is operating.

While the invention has been shown and described as controlling the flow from a well, it is to be understood that it may be applied to various lines of endeavor.

What is claimed is:

1. A pressure flow regulator system including a high pressure chamber, a low pressure chamber, means adapted for movement to control the inlet to said high pressure chamber, said means being operable upon unbalancing of the pressures, a flow valve from said high pressure chamber, automatic means operable in accordance with the back pressure on said flow valve to add the amount of the back pressure to said low pressure chamber so that the pressure differential on said flow valve will remain constant, and a relief valve in association with said last means to bleed off excessive pressure in the low pressure chamber.

2. In a pressure flow regulating system a flow chamber, a flow valve leading therefrom, a control valve leading thereto, and means to actuate said control valve in accordance with a predetermined differential pressure on said flow valve, said means including a pressure chamber and a pair of valves operable to admit or release pressure in accordance to any variation of the back pressure on said flow valve.

JAMES R. McCREARY.
LOUIS H. FULLER.